United States Patent
Shani et al.

(10) Patent No.: US 10,725,855 B2
(45) Date of Patent: Jul. 28, 2020

(54) STORAGE SYSTEM WITH DATA INTEGRITY VERIFICATION PERFORMED IN CONJUNCTION WITH INTERNAL DATA MOVEMENT

(71) Applicant: EMC IP Holding Company LLC, Hopkinton, MA (US)

(72) Inventors: Nimrod Shani, Herzliya (IL); Lior Kamran, Rishon LeZion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 180 days.

(21) Appl. No.: 16/166,397

(22) Filed: Oct. 22, 2018

(65) Prior Publication Data

US 2020/0125276 A1 Apr. 23, 2020

(51) Int. Cl.
*G06F 11/10* (2006.01)

(52) U.S. Cl.
CPC ...... *G06F 11/1004* (2013.01); *G06F 11/1088* (2013.01)

(58) Field of Classification Search
CPC .......... G06F 11/1004; G06F 11/1088
See application file for complete search history.

(56) References Cited

U.S. PATENT DOCUMENTS 6,058,428 A * 5/2000 Wang ............... H04L 29/06 707/999.002
7,444,464 B2 10/2008 Urmston et al.
(Continued)

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Joseph R Kudirka
(74) *Attorney, Agent, or Firm* — Ryan, Mason & Lewis, LLP

(57) ABSTRACT

A storage system in one embodiment comprises a plurality of storage devices and a storage controller. The storage controller is configured to identify data to be moved internally within the storage system, to compute a fingerprint for the data, and to compare the computed fingerprint to a previously-stored metadata fingerprint for the data. Responsive to the computed fingerprint being consistent with the metadata fingerprint, the data is moved to its new location within the storage system. Responsive to the computed fingerprint being inconsistent with the metadata fingerprint, the data is reconstructed and at least the computing and comparing are repeated utilizing the reconstructed data. The metadata illustratively comprises both a lightweight fingerprint and a hash-based fingerprint, with the lightweight fingerprint being computable using a reduced amount of computational resources relative to that required to compute the hash-based fingerprint, in which case the previously-stored metadata fingerprint compared to the computed fingerprint may comprise a selected one of the lightweight fingerprint and the hash-based fingerprint.

20 Claims, 6 Drawing Sheets

(56) References Cited

U.S. PATENT DOCUMENTS

| | | | |
|---|---|---|---|
| 8,095,726 | B1 | 1/2012 | O'Connell et al. |
| 8,214,612 | B1 | 7/2012 | Natanzon |
| 8,595,595 | B1 * | 11/2013 | Grcanac ............. G06F 11/1088 714/6.2 |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2013/0325824 | A1 | 12/2013 | Shoens |
| 2014/0181016 | A1 | 6/2014 | Whitehead et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

```
// read_attempts represent the RAID redundancy
Function Read (disk, offset, read_attempts) {
    If (read_attempts == 0)
        Return Read_From_Disk(disk, offset)
    Else
        Return Read_Using_Parities(disk, offset, read_attempts)
}

// read_attempts = the number of failed disks; zero when defrag
Function Read_With_Verification (disk, offset, read_attempts) {
    While (read_attempts < RAID redundancy) {
        data = Read(D1, O1, read_attempts)
        calc_fp = Fingerprint(data)
        If (calc_fp == meta_data_fp):
            Return True
        read_attempts++
    }
    Return False
}

Function Fingerprint(data) – calculate the data fingerprint

Upon decision to move/rebuild data from disk D1 offset O1 to disk D2 offset O2:
If (Read_With_Verification(D1, O1), read_attempts) == True)
    Write the data to D2, O2
Else
    Report Data Failure
```

FIG. 3

STORAGE SYSTEM WITH DATA INTEGRITY VERIFICATION PERFORMED IN CONJUNCTION WITH INTERNAL DATA MOVEMENT

FIELD

The field relates generally to information processing systems, and more particularly to storage in information processing systems.

BACKGROUND

In a given storage system, data may be moved internally for any of a wide variety of different reasons. For example, background processes such as defragmentation typically involve substantial amounts of data movement. Data may also be relocated in conjunction with rebuilding of data from parity information in a redundant array of independent disks (RAID) arrangement, typically in response to a disk failure or other type of failure within the storage system. Conventional approaches are generally configured to relocate the data and then to update the associated metadata. It is possible that the relocated data in such arrangements could be inconsistent with the original data due to various errors resulting from hardware or software issues. Movement of the data in such scenarios can lead to data loss as it may no longer be possible to recover the corrupted data using RAID parity information. More particularly, moving the data from one location to another within a given RAID configuration can result in loss of the parity information.

SUMMARY

Illustrative embodiments provide storage systems configured with functionality for performing data integrity verification in conjunction with internal data movement. For example, one or more such embodiments can be advantageously configured to perform one or more data integrity checks prior to actual movement of the data, and to recover the data using RAID parity information responsive to a failure in such a check. The data integrity check in embodiments of this type therefore occurs before the data is moved to a new location and the RAID parity information is potentially lost.

These embodiments illustratively include a clustered implementation of a content addressable storage system having a distributed storage controller. Similar advantages can be provided in other types of storage systems.

In one embodiment, a storage system comprises a plurality of storage devices and a storage controller. The storage controller is configured to identify data to be moved internally within the storage system, to compute a fingerprint for the data, and to compare the computed fingerprint to a previously-stored metadata fingerprint for the data. Responsive to the computed fingerprint being consistent with the metadata fingerprint, the data is moved to its new location within the storage system. Responsive to the computed fingerprint being inconsistent with the metadata fingerprint, the data is reconstructed and at least the computing and comparing are repeated utilizing the reconstructed data.

The storage system illustratively stores the data utilizing a RAID arrangement that provides parity information supporting at least one recovery option for reconstructing the data. For example, a RAID 6 arrangement that supports two distinct recovery options for reconstructing the data may be used. A wide variety of other RAID or non-RAID arrangements can be used for storing data in the storage system.

In some embodiments, computing the fingerprint for the data comprises computing the fingerprint as a lightweight fingerprint utilizing a cyclic redundancy check (CRC) algorithm, such as a 16-bit CRC algorithm or a 32-bit CRC algorithm. Numerous other types of lightweight fingerprints can be used in other embodiments.

It is also possible that computing the fingerprint for the data comprises computing the fingerprint as a hash-based fingerprint utilizing a secure hashing algorithm.

In some embodiments, the storage system is configured to store the data in association with metadata that comprises a lightweight fingerprint and a hash-based fingerprint wherein the lightweight fingerprint is computable using a reduced amount of computational resources relative to that required to compute the hash-based fingerprint. In an arrangement of this type, the previously-stored metadata fingerprint comprises a selected one of the lightweight fingerprint and the hash-based fingerprint.

For example, in a first iteration of the computing and comparing, a lightweight fingerprint is computed for the data and compared to the lightweight fingerprint of the metadata. Responsive to the computed lightweight fingerprint being inconsistent with the lightweight fingerprint of the metadata in the first iteration of the computing and comparing, a second iteration of the computing and comparing is performed in which a hash-based fingerprint is computed for the data and compared to the hash-based fingerprint of the metadata.

Responsive to the computed hash-based fingerprint being consistent with the hash-based fingerprint of the metadata, the data is moved to its new location within the storage system, the lightweight fingerprint is recomputed, and the metadata is updated to include the recomputed lightweight fingerprint.

Responsive to the computed hash-based fingerprint being inconsistent with the hash-based fingerprint of the metadata, the data is reconstructed and at least the computing and comparing are repeated utilizing the reconstructed data.

The hash-based fingerprint may comprise a complete hash digest of the data, or a hash handle of the data.

Responsive to the computed fingerprint being inconsistent with the metadata fingerprint after all available recovery options for reconstructing the data have been utilized, a data integrity check failure is reported.

The storage system in some embodiments comprises a content addressable storage system implemented utilizing non-volatile memory storage devices, such as flash-based storage devices. For example, the storage devices of the storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

BRIEF DESCRIPTION OF THE DRAWINGS

FIG. 3 is a set of pseudocode of a process for data integrity verification in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
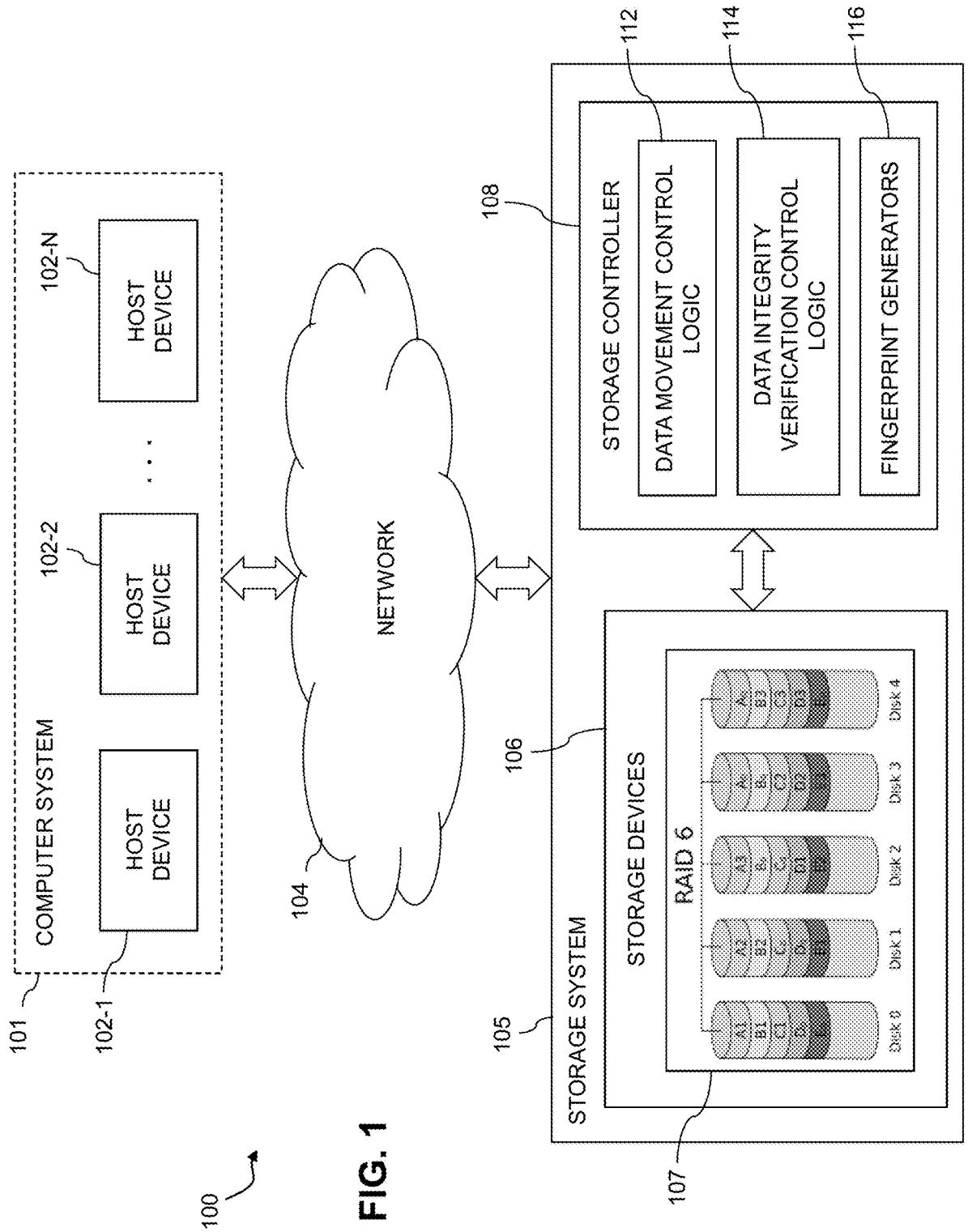
FIG. 1 is a block diagram of an information processing system comprising a storage system configured with functionality for data integrity verification in an illustrative embodiment.

FIG. 1 shows an information processing system 100 configured in accordance with an illustrative embodiment. The information processing system 100 comprises a computer system 101 that includes host devices 102-1, 102-2, ... 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, an infrastructure-as-a-service (IaaS) model and/or a function-as-a-service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106 implementing at least one RAID 6 arrangement 107 involving multiple ones of the storage devices 106. Additional or alternative RAID or non-RAID arrangements can be used to store data in the storage system 105. The storage system 105 further comprises a storage controller 108. The storage devices 106 store storage volumes, such as logical units (LUNs) or other types of logical storage volumes accessible to system users via their respective host devices 102.

The RAID 6 arrangement 107 in this embodiment illustratively includes an array of five different "disks" denoted Disk 0, Disk 1, Disk 2, Disk 3 and Disk 4, each a different physical storage device of the storage devices 106. Multiple such physical storage devices are typically utilized to store data of a given LUN or other logical storage volume in the storage system 105. For example, data pages or other data blocks of a given LUN or other logical storage volume can be "striped" along with its corresponding parity information across multiple ones of the disks in the RAID 6 arrangement 107 in the manner illustrated in the figure.

A given RAID 6 arrangement defines block-level striping with double distributed parity and provides fault tolerance of two drive failures, so that the array continues to operate with up to two failed drives, irrespective of which two drives fail. In the RAID 6 arrangement 107, data blocks A1, A2 and A3 and corresponding p-type and q-type parity information Ap and Aq are arranged in a row or stripe as shown. Other data and parity blocks in the RAID 6 arrangement 107 are distributed over the disks in a similar manner, collectively providing a diagonal-based configuration for the p-type and q-type parity information, so as to support the above-noted double distributed parity and its associated fault tolerance. Other types of RAID implementations can be used, as will be appreciated by those skilled in the art, possibly using error correcting codes in place of parity information.

Additional details regarding exemplary techniques for storing data in RAID arrays such as the RAID 6 arrangement 107 of the FIG. 1 embodiment are disclosed in U.S. Pat. No. 9,552,258, entitled "Method and System for Storing Data in RAID Memory Devices," which is incorporated by reference herein.

References to "disks" in this embodiment and others disclosed herein are intended to be broadly construed, and are not limited to hard disk drives (HDDs) or other rotational media. For example, at least portions of the storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

Accordingly, it is to be appreciated that a variety of different types of storage devices can be used in illustrative embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage controller 108 of storage system 105 in the FIG. 1 embodiment includes data movement control logic 112, data integrity verification control logic 114, and associated fingerprint generators 116. The data movement control logic 112 and data integrity verification control logic 114 are configured to control performance of a data integrity verification process for internal data movement in storage system 105, such as the process illustrated in the flow diagram of FIG. 2, utilizing fingerprints computed by the fingerprint generators 116. The fingerprints computed by the fingerprint generators 116 are assumed to be maintained in a memory of the storage system 105 at least in part under the control of the data movement control logic 112 and the data integrity verification control logic 114. The storage controller 108 and storage system 105 should also be understood to include additional modules and other components typically found in conventional implementations of storage controllers and storage systems, although such additional modules and other components are omitted from the figure for clarity and simplicity of illustration.

The storage controller 108 via its data movement control logic 112, data integrity verification control logic 114 and fingerprint generators 116 is configured to identify data to be moved internally within the storage system 105, to compute a fingerprint for the data, and to compare the computed fingerprint to a previously-stored metadata fingerprint for the data. For example, the data to be moved may comprise a particular portion of the data in the RAID 6 arrangement 107, such as data in the A3 position designated for movement to a new location corresponding to position E3. Multiple such data portions can be designated for movement in other embodiments. Also, a wide variety of other types of data movement in both RAID and non-RAID arrangements can be supported.

In some embodiments, the internal data movement is associated with a defragmentation process or other type of background process carried out in the storage system 105. Accordingly, the identified data can comprise a page or other type of block, or a set of pages or other types of blocks, designated for movement as part of a defragmentation process or other type of background process. The computation of the fingerprint and its comparison with the metadata fingerprint occur prior to actual movement of the identified data.

The computed fingerprint is illustratively a lightweight fingerprint computed using a CRC algorithm, such as a 16-bit CRC algorithm or a 32-bit CRC algorithm. This is in contrast to more computation-intensive fingerprints, such as hash-based fingerprints generated using a secure hashing algorithm such as SHA1. Other types of lightweight and/or hash-based fingerprints can be used in other embodiments.

Responsive to the computed fingerprint being consistent with the metadata fingerprint, the storage controller 108 directs the movement of the data to its new location within the storage system 105. However, if the computed fingerprint is inconsistent with the metadata fingerprint, the storage controller 108 reconstructs the data and repeats at least the computing and comparing utilizing the reconstructed data.

Terms such as "consistent" and "inconsistent" as used herein in the context of comparing computed and metadata fingerprints are intended to be broadly construed. For example, a determination of consistency between a computed fingerprint for a given data item and its corresponding metadata fingerprint can require an exact match in some embodiments. Alternatively, a detected similarity that is above a specified threshold level of similarity between the computed and metadata fingerprints can indicate consistency in some embodiments. It is also possible in some embodiments that only particular designated portions of the computed and metadata fingerprints can be compared and the result used to determine consistency. Numerous alternative arrangements are possible for determining consistency or inconsistency of computed and metadata fingerprints.

Similarly, the term "fingerprint" as used herein is intended to be broadly construed, so as to encompass lightweight signatures generated using CRC algorithms or other similar approaches, and well as more computation-intensive content-based signatures based on secure hashing algorithms.

The RAID 6 arrangement 107 utilized in the storage system 105 supports two distinct recovery options for reconstructing the data. Accordingly, if the computed fingerprint is found to be inconsistent with the metadata fingerprint, the data is reconstructed using a selected one of the two distinct recovery options, and the fingerprint computation and the comparison of the computed fingerprint with the metadata fingerprint are repeated. If the computed fingerprint is again found to be inconsistent with the metadata fingerprint, the data is reconstructed using the remaining one of the two distinct recovery options, and the fingerprint computation and the comparison of the computed fingerprint with the metadata fingerprint are again repeated. In this particular embodiment, it is only after both of the available RAID 6 recovery options fail to produce data having a computed fingerprint that matches the metadata fingerprint that a data integrity check failure is reported. The prospective internal data movement may be terminated or other appropriate actions taken responsive to the reported failure.

In some embodiments, the storage controller 108 is configured to maintain in metadata, for a given unit of data subject to internal movement, both a lightweight fingerprint computed using a CRC algorithm and a hash-based fingerprint computed using a secure hashing algorithm such as SHA1. The lightweight fingerprint is computable using a reduced amount of computational resources relative to that required to compute the hash-based fingerprint. The unit of data subject to internal movement in the storage system 105 may comprise a page of data or other fixed-size block of data.

For example, the storage system 105 in some embodiments comprises a content addressable storage system such as the above-noted XtremIO™ storage array in which the units of data are data pages. A storage system of this type generates hash-based fingerprints in the form of what are also referred to herein as "content-based signatures" for respective data pages. The content-based signatures illustratively comprise hash digests of their respective pages, each generated by application of a cryptographic hash function or other secure hashing algorithm such as the above-noted SHA1 to the content of its corresponding page. It is also possible that other types of content-based signatures may be used, such as hash handles of the type described elsewhere herein.

A given content-based signature in illustrative embodiments is unique to the particular content of the page from which it is generated, such that two pages with exactly the same content will have the same content-based signature, while two pages with different content will have different content-based signatures. Again, such content-based signatures are examples of what are referred to herein as hash-based fingerprints.

In embodiments in which the storage system 105 is configured to store the data in association with metadata that comprises both a lightweight fingerprint and a hash-based fingerprint, multiple iterations of the computing and comparing may be used. For example, in a first iteration of the computing and comparing, a lightweight fingerprint is computed for the data and compared to the lightweight fingerprint of the metadata. Responsive to the computed lightweight fingerprint being inconsistent with the lightweight fingerprint of the metadata in the first iteration of the computing and comparing, a second iteration of the computing and comparing is performed in which a hash-based fingerprint is computed for the data and compared to the hash-based fingerprint of the metadata.

If in the second iteration the computed hash-based fingerprint is found to be consistent with the hash-based fingerprint of the metadata, the data is moved to its new location within the storage system 105, the lightweight fingerprint is recomputed, and the metadata is updated to include the recomputed lightweight fingerprint.

If in the second iteration the computed hash-based fingerprint is found to be inconsistent with the hash-based fingerprint of the metadata, the data is reconstructed and at least the computing and comparing are repeated utilizing the reconstructed data. If necessary, the computing and comparing can be similarly repeated one or more additional times until all available recovery options have been exhausted, at which point a data integrity check failure is reported and appropriate actions based on the reported failure are taken, such as terminating the prospective internal data movement and providing notice of such to one or more system users.

The above-described operations carried out in conjunction with a process for performing data integrity verification in conjunction with internal data movement in the storage system 105 are illustratively performed at least in part under the control of the data movement control logic 112 and the data integrity verification control logic 114 utilizing lightweight and/or hash-based fingerprints computed by the fingerprint generators 116. Such components illustratively correspond to respective portions of a processor of a processing device, and/or software components running on such a processor.

The host devices 102 and storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 102, network 104, storage system 105, storage devices 106 and storage controller 108 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for data integrity verification for data movement can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

The operation of the information processing system 100 will now be described in further detail with reference to the flow diagram of the illustrative embodiment of FIG. 2. The process as shown includes steps 200 through 210, and is suitable for use in system 100 but is more generally applicable to other types of information processing systems in which a storage system is configured for internal data movement. The steps are illustratively performed at least in part under the control of the data movement control logic 112 and the data integrity verification control logic 114 utilizing fingerprints computed by one or more of the fingerprint generators 116 in storage system 105 of system 100.

In step 200, a fingerprint is computed for data to be moved within the storage system. The data to be moved is illustratively a designated portion of the data stored on a particular one of the disks of the RAID 6 arrangement 107 in storage system 105 of system 100. For example, data in the A3 position in the RAID 6 arrangement 107 can be designated for movement to position E3 in the RAID 6 arrangement 107. Multiple such data portions can be designated for movement in other embodiments. Also, a wide variety of other types of data movement in both RAID and non-RAID arrangements can be supported.

The fingerprint computed in step 200 is illustratively a lightweight fingerprint computed using a CRC algorithm, such as a 16-bit CRC algorithm or a 32-bit CRC algorithm. This is in contrast to more computation-intensive fingerprints, such as hash-based fingerprints generated using a secure hashing algorithm such as SHA1. Other types of lightweight and/or hash-based fingerprints can be used in other embodiments.

In step 202, a determination is made as to whether or not the computed fingerprint is the same as a metadata fingerprint previously stored for the data that is to be moved. If the computed fingerprint is the same as the previously-stored metadata fingerprint, the process moves to step 204, and otherwise moves to step 206.

Step 202 is an example of what is referred to herein as a "comparing" step or operation, and is used to determine if the computed fingerprint from step 200 is consistent with the previously-stored fingerprint of the metadata for the data that is designated for movement. The particular determination that the computed fingerprint is "the same as" the metadata fingerprint in step 202 is an example of one type of consistency determination, and other types of consistency determinations can be used on other embodiments. For example, a particular designated portion of the computed fingerprint can be compared to the corresponding portion of the metadata fingerprint in step 202 and the consistency determination made on that basis, instead of being made based on exact equivalence between the two fingerprints as illustrated in the figure. Other types of consistency determinations between a computed fingerprint and a metadata fingerprint can be made in step 202 in other embodiments.

In step 204, the data designated for movement is moved to its new storage location in the storage system. Continuing with the above-noted example, the data in the A3 position in the RAID 6 arrangement 107 can be moved to its destination location at position E3 in the RAID 6 arrangement 107. Again, numerous other types of data movement and storage arrangements can be used in other embodiments.

In step 206, a determination is made as to whether or not all available recovery options for the data have already been utilized. For example, the RAID 6 arrangement 107 of storage system 105 supports two distinct recovery options for reconstructing the data. If all available recovery options have been utilized and the computed fingerprint still does not match the previously-stored metadata fingerprint, the process moves to step 208, and otherwise moves to step 210 as indicated in the figure.

In step 208, which is reached after all available recovery options have been utilized and the computed fingerprint still does not match the previously-stored metadata fingerprint, a data integrity check failure is reported. For example, such a data integrity check failure can be reported by the data integrity verification control logic 114 to the data movement control logic 112. Other types of data integrity check failure reports can be generated in step 208 in other embodiments. For example, the data integrity check failure can be reported by the storage controller 108 to an application running on one of the host devices 102 of the computer system 101 in system 100. Responsive to such a report, the proposed data movement can be terminated or other appropriate actions can be taken.

In step 210, the data is reconstructed using a selected one of the one or more available recovery options that have not yet been utilized in the current execution of the process. The process then returns to step 200 to compute a fingerprint for the reconstructed data, which is then compared to the previously-stored metadata fingerprint in step 202, and the process continues in the manner previously described.

Figure 2:
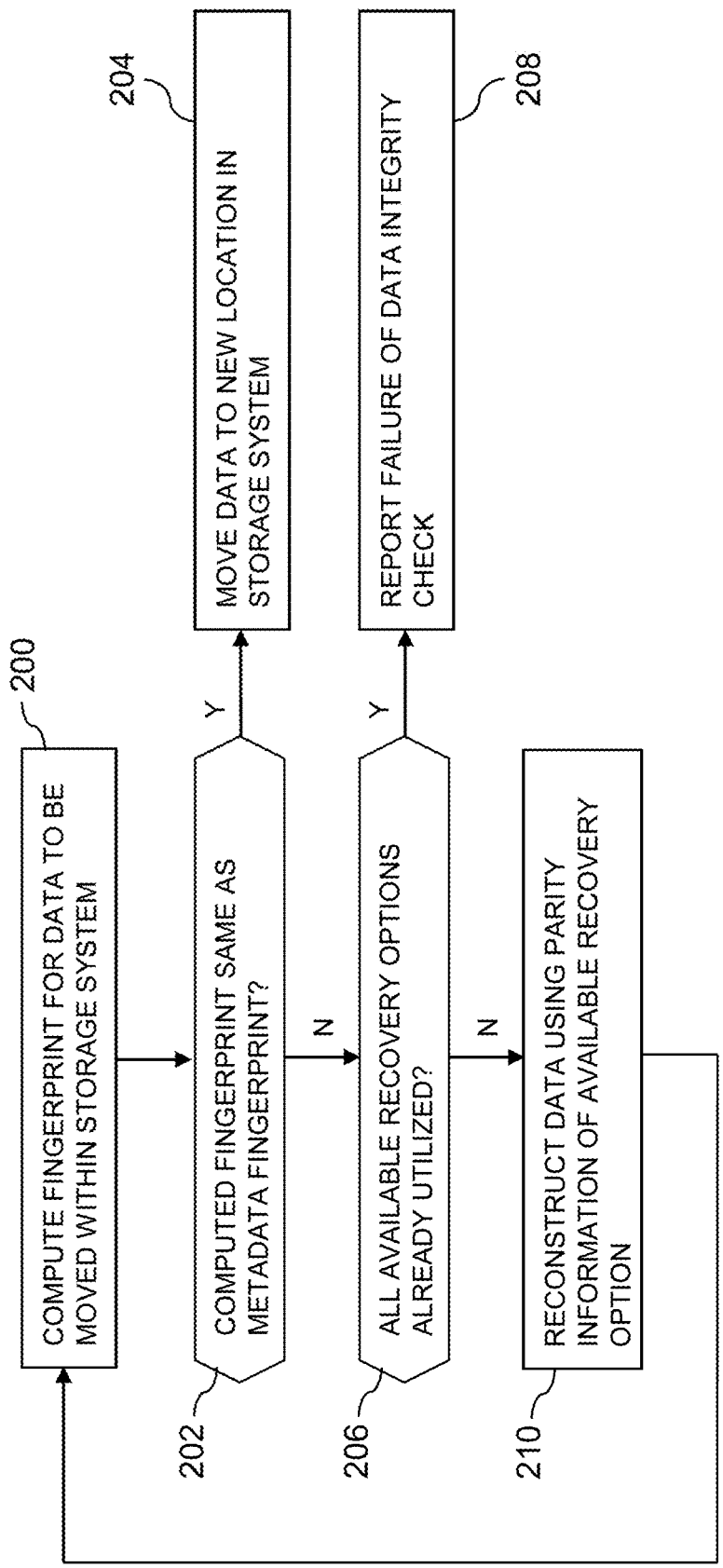
FIG. 2 is a flow diagram of a process for data integrity verification in an illustrative embodiment.

The FIG. 2 process can be repeated for each of a plurality of different data portions that are designated for movement in the storage system. The process can be terminated under various conditions, possibly specified by or under the control of the data movement control logic 112, such as a change in the designation of the data to be moved, a remapping, rezoning or other reconfiguration of a corresponding storage volume within the storage system 105, or deletion of the storage volume from the storage system 105.

The illustrative embodiment of FIG. 2 is an example of a data integrity verification embodiment in which a computed fingerprint, such as a lightweight fingerprint computed using a CRC algorithm, is compared to a previously-stored metadata fingerprint of the same type. In other embodiments, the storage system is configured to store the data in association with metadata that comprises both a lightweight fingerprint and a hash-based fingerprint. As indicated previously, the lightweight fingerprint is computable using a reduced amount of computational resources relative to that required to compute the hash-based fingerprint. The hash-based fingerprint illustratively comprising a complete hash digest of the data, possibly generated using a secure hashing algorithm such as SHA1. Alternatively, a hash handle of the type described elsewhere herein can be used as the hash-based fingerprint.

The fingerprint computation and comparison in steps 200 and 202 can then be implemented in multiple iterations. In a first iteration, the lightweight fingerprint is computed for the data and compared to the previously-stored lightweight fingerprint of the metadata. Responsive to the computed lightweight fingerprint being inconsistent with the lightweight fingerprint of the metadata in the first iteration of the computing and comparing steps 200 and 202, a second iteration of the computing and comparing steps 200 and 202 is performed in which a hash-based fingerprint is computed for the data and compared to the previously-stored hash-based fingerprint of the metadata.

Responsive to a determination that the computed hash-based fingerprint is consistent with the hash-based fingerprint of the metadata in step 202, the data is moved to its new location within the storage system in step 204. Also, the lightweight fingerprint is recomputed, and the metadata is updated to include the recomputed lightweight fingerprint.

Responsive to a determination that the computed hash-based fingerprint is inconsistent with the hash-based fingerprint of the metadata in step 202, the data is reconstructed in step 210, assuming there is at least one available recovery option not yet utilized in the current execution of the process, and at least the computing and comparing of steps 200 and 202 are repeated utilizing the reconstructed data.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for performing data integrity verification in conjunction with internal data movement in a storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different data integrity verification processes for respective different sets of data or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server.

FIG. 3 shows an example set of pseudocode for performing data integrity verification in conjunction with internal data movement in an illustrative embodiment. This pseudocode illustrates one possible software program implementation of the FIG. 2 process. Different portions of the pseudocode in this implementation correspond to portions of the data movement control logic 112, data integrity verification control logic 114, and fingerprint generators 116 of the storage controller 108 in storage system 105. Executable program code for the pseudocode of FIG. 3 can be stored in a memory or other storage device of the storage system 105. Other types of software programs can be used in other embodiments.

As will be described below, a memory or other storage device having executable program code of one or more software programs embodied therein is an example of what is more generally referred to herein as a "processor-readable storage medium."

A storage controller such as storage controller 108 of storage system 105 that is configured to control performance of one or more steps of the FIG. 2 process in its corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controller 108, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate data integrity verification techniques as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of the storage system 105, and accordingly is assumed to be coupled to host devices 102 of computer system 101 via network 104 within information processing system 100.

The storage controller 408 in the present embodiment is configured to implement data integrity verification functionality of the type previously described in conjunction with FIGS. 1 through 3.

The storage controller 408 includes distributed modules 412, 414 and 416, which are configured to operate in a manner similar to that described above for respective corresponding modules 112, 114 and 116 of storage controller 108, so as to provide functionality for performing data integrity verification in conjunction with internal data movement in content addressable storage system 405.

Figure 4:
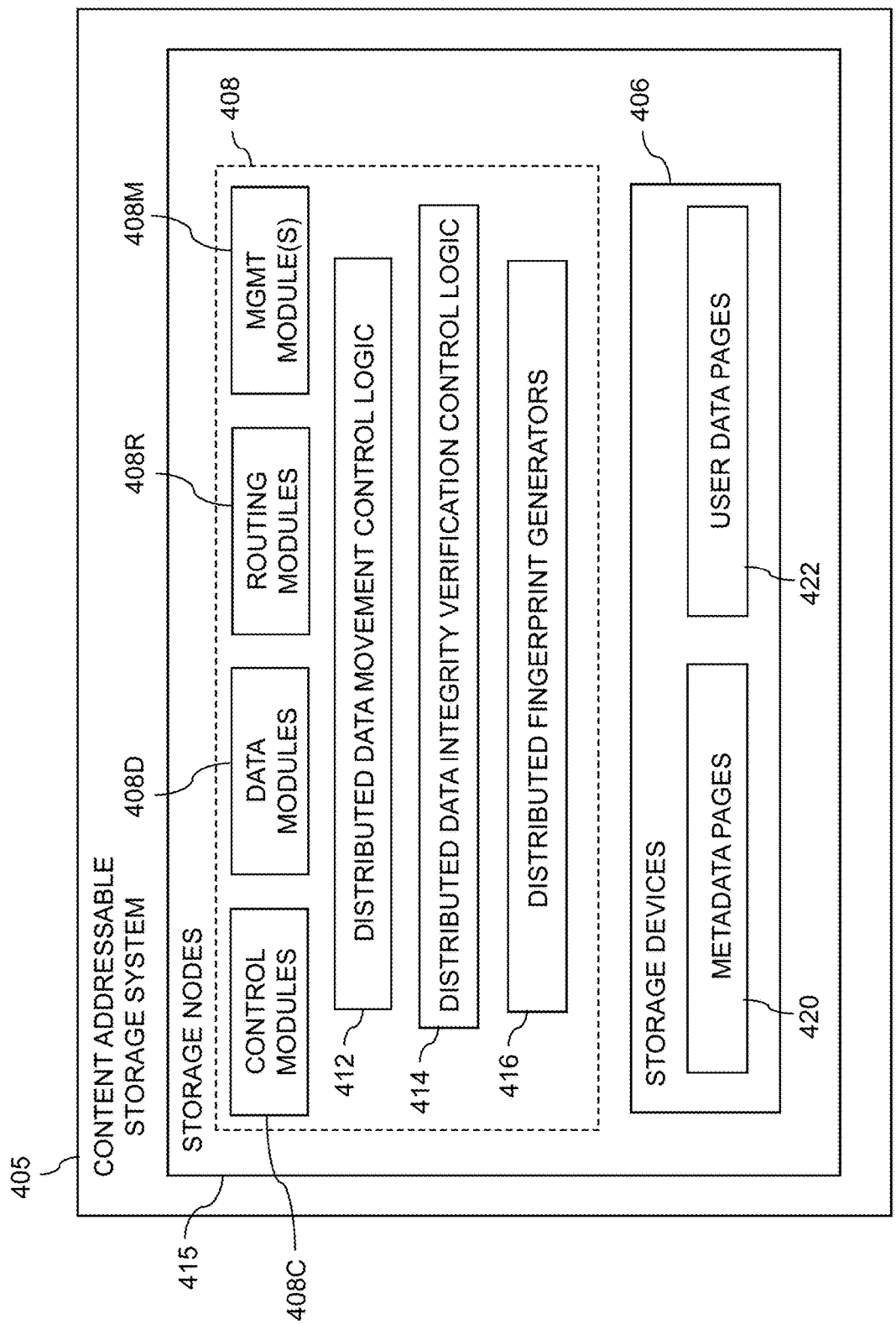
FIG. 4 shows a content addressable storage system having a distributed storage controller configured with functionality for data integrity verification in an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Other clustered storage system arrangements comprising multiple storage nodes can be used in other embodiments. A given clustered storage system may include not only storage nodes 415 but also additional storage nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 may be more particularly referred to as a distributed storage controller.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415.

Each of the storage nodes 415 of the storage system 405 therefore comprises a set of processing modules configured to communicate over one or more networks with corresponding sets of processing modules on other ones of the storage nodes. A given such set of processing modules implemented on a particular storage node illustratively includes at least one control module 408C, at least one data module 408D and at least one routing module 408R, and possibly a management module 408M. These sets of processing modules of the storage nodes collectively comprise at least a portion of the distributed storage controller 408.

Communication links may be established between the various processing modules of the distributed storage controller 408 using well-known communication protocols such as IP, Transmission Control Protocol (TCP), and remote direct memory access (RDMA). For example, respective sets of IP links used in data transfer and corresponding messaging could be associated with respective different ones of the routing modules 408R.

Although shown as separate modules of the distributed storage controller 408, the modules 412, 414 and 416 in the present embodiment are assumed to be distributed at least in part over at least a subset of the other modules 408C, 408D, 408R and 408M of the storage controller 408. Accordingly, at least portions of the functionality of the modules 412, 414 and 416 may be implemented in one or more of the other modules of the storage controller 408. In other embodiments, one or more of the modules 412, 414 and 416 may be implemented as respective stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 422 can include any type of user data that may be utilized in the system 100. The term "user data" herein is therefore also intended to be broadly construed.

Data for which data integrity verification is performed in conjunction with internal data movement using modules 412, 414 and 416 illustratively comprises data associated with one or more of the user data pages 422 stored in storage devices 406.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422, and can be used as hash-based fingerprints for data integrity verification in illustrative embodiments as described elsewhere herein. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The data integrity verification functionality provided by modules 412, 414 and 416 in this embodiment is assumed to be distributed across multiple distributed processing modules, including at least a subset of the processing modules 408C, 408D, 408R and 408M of the distributed storage controller 408.

For example, the management module 408M of the storage controller 408 may include a data integrity verification control logic instance that engages corresponding data verification control logic instances in all of the control modules 408C and routing modules 408R in order to implement a data integrity verification process.

In some embodiments, the content addressable storage system 405 comprises an XtremIO™ storage array suitably modified to incorporate techniques for data integrity verification for data movement as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, data integrity verification functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device, illustratively one of the host devices 102. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 405.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 406. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement data integrity verification functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with data integrity verification functionality as disclosed herein can provide a number of significant advantages relative to conventional arrangements.

For example, some embodiments are advantageously configured to perform one or more data integrity checks prior to actual movement of the data, and to recover the data using RAID parity information responsive to a failure in such a check. The data integrity check in embodiments of this type therefore occurs before the data is moved to a new location and the RAID parity information is potentially lost.

As a result, internal data movement scenarios that might otherwise lead to data corruption are avoided, and storage system performance is improved.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with data integrity verification functionality will now be described in greater detail with reference to FIGS. 5 and 6. Although described in the context of system 100, these platforms may also be used to implement at least portions of other information processing systems in other embodiments.

Figure 5:
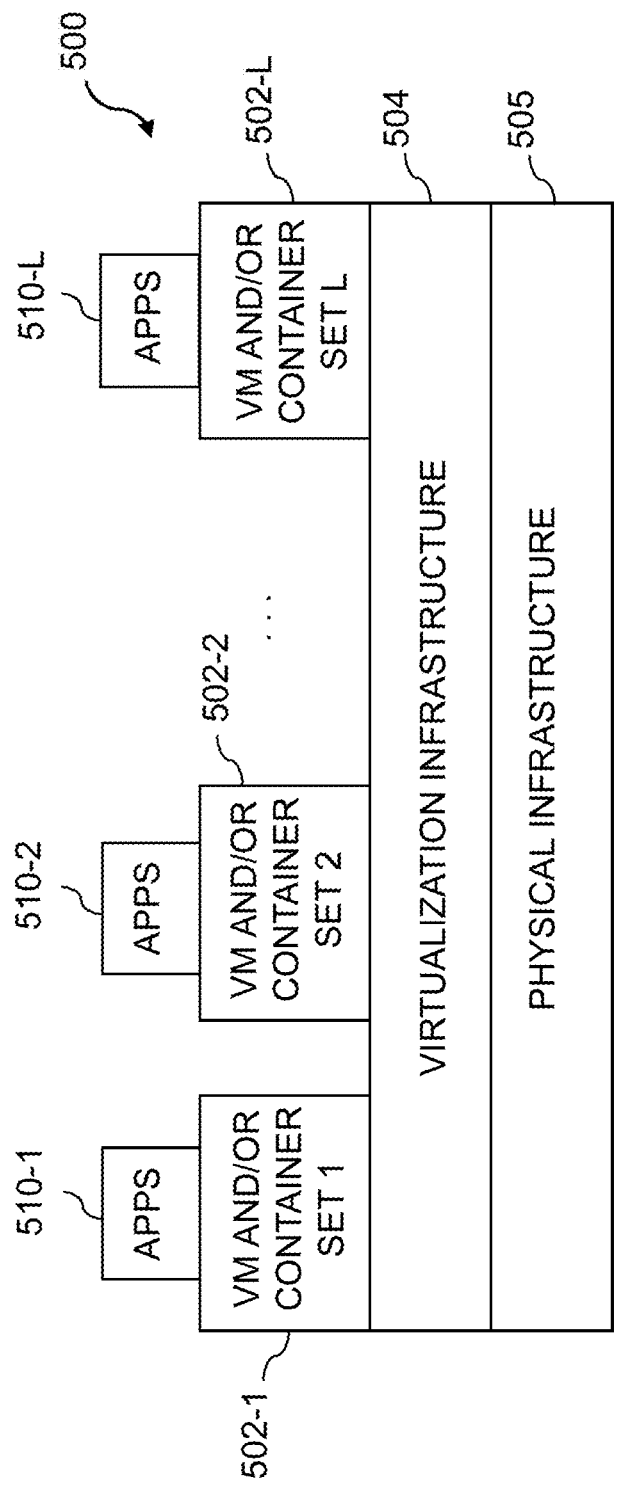
FIGS. 5 and 6 show examples of processing platforms that may be utilized to implement at least a portion of an information processing system in illustrative embodiments.
Figure 6:
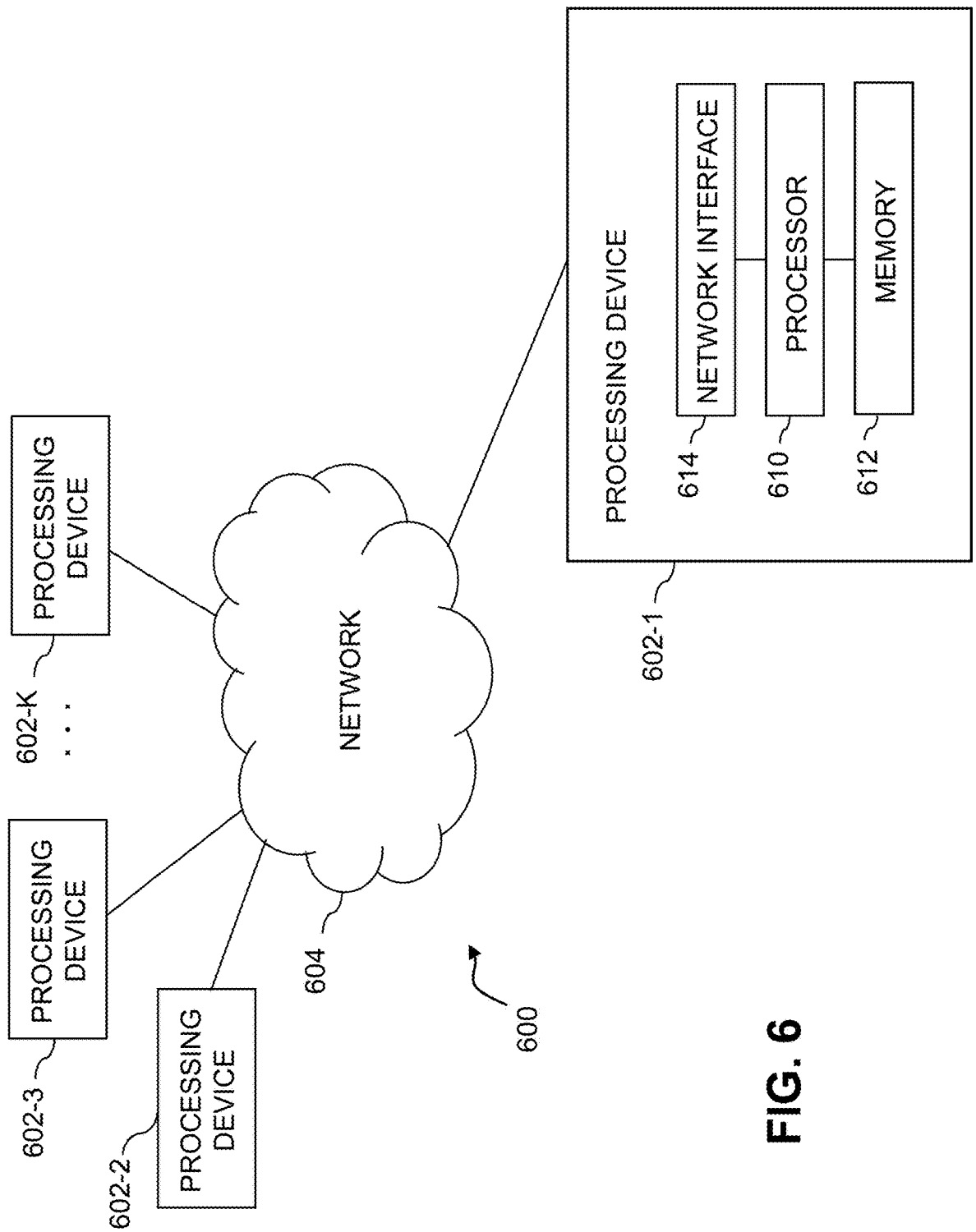

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide data integrity verification functionality of the type described above for one or more processes running on a given one of the VMs. For example, one or more of the VMs can implement data movement control logic, data integrity verification control logic and one or more fingerprint generators for providing data integrity verification functionality for data movement in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide data integrity verification functionality of the type described above. For example, a container host device supporting multiple containers of one or more container sets can implement data movement control logic, data integrity verification control logic and one or more fingerprint generators for providing data integrity verification functionality for data movement in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the data integrity verification functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, data integrity verification processes, RAID and non-RAID storage arrangements, internal data movement types, data fingerprints and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices and a storage controller;
the storage controller being configured:
to identify data to be moved internally within the storage system;
to compute a fingerprint for the data;
to compare the computed fingerprint to a previously-stored metadata fingerprint for the data;
responsive to the computed fingerprint being consistent with the metadata fingerprint, to move the data to its new location within the storage system; and
responsive to the computed fingerprint being inconsistent with the metadata fingerprint, to reconstruct the data and to repeat at least the computing and comparing utilizing the reconstructed data;
wherein the storage controller comprises at least one processing device comprising a processor coupled to a memory.

2. The apparatus of claim 1 wherein the storage system stores the data utilizing a redundant array of independent disks (RAID) arrangement that provides parity information supporting at least one recovery option for reconstructing the data.

3. The apparatus of claim 1 wherein the storage system stores the data utilizing a RAID 6 arrangement that supports two distinct recovery options for reconstructing the data.

4. The apparatus of claim 1 wherein computing the fingerprint for the data comprises computing the fingerprint as a lightweight fingerprint utilizing a cyclic redundancy check (CRC) algorithm.

5. The apparatus of claim 4 wherein computing the lightweight fingerprint comprises computing the lightweight fingerprint utilizing one of a 16-bit CRC algorithm and a 32-bit CRC algorithm.

6. The apparatus of claim 1 wherein computing the fingerprint for the data comprises computing the fingerprint as a hash-based fingerprint utilizing a secure hashing algorithm.

7. The apparatus of claim 1 wherein the storage system is configured to store the data in association with metadata that comprises a lightweight fingerprint and a hash-based fingerprint wherein the lightweight fingerprint is computable using a reduced amount of computational resources relative to that required to compute the hash-based fingerprint and wherein the previously-stored metadata fingerprint comprises a selected one of the lightweight fingerprint and the hash-based fingerprint.

8. The apparatus of claim 7 wherein in a first iteration of the computing and comparing, a lightweight fingerprint is computed for the data and compared to the lightweight fingerprint of the metadata.

9. The apparatus of claim 8 wherein responsive to the computed lightweight fingerprint being inconsistent with the lightweight fingerprint of the metadata in the first iteration of the computing and comparing, a second iteration of the computing and comparing is performed in which a hash-based fingerprint is computed for the data and compared to the hash-based fingerprint of the metadata.

10. The apparatus of claim 9 wherein responsive to the computed hash-based fingerprint being consistent with the hash-based fingerprint of the metadata, the data is moved to its new location within the storage system, the lightweight fingerprint is recomputed, and the metadata is updated to include the recomputed lightweight fingerprint.

11. The apparatus of claim 9 wherein responsive to the computed hash-based fingerprint being inconsistent with the hash-based fingerprint of the metadata, the data is reconstructed and at least the computing and comparing are repeated utilizing the reconstructed data.

12. The apparatus of claim 7 wherein the hash-based fingerprint comprises a complete hash digest of the data.

13. The apparatus of claim 7 wherein the hash-based fingerprint comprises a hash handle of the data.

14. The apparatus of claim 1 wherein responsive to the computed fingerprint being inconsistent with the metadata fingerprint after all available recovery options for reconstructing the data have been utilized, reporting a data integrity check failure.

15. A method comprising:
identifying data to be moved internally within a storage system;
computing a fingerprint for the data;
comparing the computed fingerprint to a previously-stored metadata fingerprint for the data;
responsive to the computed fingerprint being consistent with the metadata fingerprint, moving the data to its new location within the storage system; and
responsive to the computed fingerprint being inconsistent with the metadata fingerprint, reconstructing the data and repeating at least the computing and comparing utilizing the reconstructed data;
wherein the method is implemented by at least one processing device comprising a processor coupled to a memory.

16. The method of claim 15 wherein the storage system is configured to store the data in association with metadata that comprises a lightweight fingerprint and a hash-based fingerprint wherein the lightweight fingerprint is computable using a reduced amount of computational resources relative to that required to compute the hash-based fingerprint and wherein the previously-stored metadata fingerprint comprises a selected one of the lightweight fingerprint and the hash-based fingerprint.

17. The method of claim 16 wherein in a first iteration of the computing and comparing, a lightweight fingerprint is computed for the data and compared to the lightweight fingerprint of the metadata, and responsive to the computed lightweight fingerprint being inconsistent with the lightweight fingerprint of the metadata in the first iteration of the computing and comparing, a second iteration of the computing and comparing is performed in which the hash-based fingerprint is computed for the data and compared to the hash-based fingerprint of the metadata.

18. A computer program product comprising a non-transitory processor-readable storage medium having stored therein program code of one or more software programs, wherein the program code when executed by at least one processing device causes said at least one processing device:
- to identify data to be moved internally within a storage system;
- to compute a fingerprint for the data;
- to compare the computed fingerprint to a previously-stored metadata fingerprint for the data;
- responsive to the computed fingerprint being consistent with the metadata fingerprint, to move the data to its new location within the storage system; and
- responsive to the computed fingerprint being inconsistent with the metadata fingerprint, to reconstruct the data and to repeat at least the computing and comparing utilizing the reconstructed data.

19. The computer program product of claim 18 wherein the storage system is configured to store the data in association with metadata that comprises a lightweight fingerprint and a hash-based fingerprint wherein the lightweight fingerprint is computable using a reduced amount of computational resources relative to that required to compute the hash-based fingerprint and wherein the previously-stored metadata fingerprint comprises a selected one of the lightweight fingerprint and the hash-based fingerprint.

20. The computer program product of claim 19 wherein in a first iteration of the computing and comparing, a lightweight fingerprint is computed for the data and compared to the lightweight fingerprint of the metadata, and responsive to the computed lightweight fingerprint being inconsistent with the lightweight fingerprint of the metadata in the first iteration of the computing and comparing, a second iteration of the computing and comparing is performed in which the hash-based fingerprint is computed for the data and compared to the hash-based fingerprint of the metadata.

* * * * *